(12) United States Patent
Crawford

(10) Patent No.: US 6,964,422 B2
(45) Date of Patent: Nov. 15, 2005

(54) MEDICAL DEVICE CARRIER

(76) Inventor: Robert S. Crawford, 30120 Oak Shadows Dr., Walker, LA (US) 70785

( * ) Notice: Subject to any disclaimer, the term of this patent is extended or adjusted under 35 U.S.C. 154(b) by 0 days.

(21) Appl. No.: 10/710,429

(22) Filed: Jul. 9, 2004

(65) Prior Publication Data

US 2004/0232640 A1 Nov. 25, 2004

Related U.S. Application Data

(63) Continuation of application No. 10/225,939, filed on Aug. 21, 2002, now abandoned.

(51) Int. Cl.$^7$ ............................................. B62B 3/02
(52) U.S. Cl. ........................... 280/47.36; 280/47.34; 280/79.2; 280/47.371; 280/79.11
(58) Field of Search .................... 280/655.1, 87.01, 280/47.18, 47.315, 47.34, 47.35, 47.36, 47.371, 280/79.11, 79.2

(56) References Cited

U.S. PATENT DOCUMENTS

| | | | |
|---|---|---|---|
| 393,514 A | 11/1888 | Mawhinney | |
| 672,921 A | 4/1901 | Slingsby | |
| 3,005,640 A | 10/1961 | Cole | |
| 3,177,000 A * | 4/1965 | Alexander | 280/655 |
| 3,295,622 A | 1/1967 | Pitchford | |
| 4,274,644 A * | 6/1981 | Taylor | 280/39 |
| 4,277,075 A * | 7/1981 | Shay | 280/47.36 |
| 4,505,495 A * | 3/1985 | Foss et al. | 280/651 |
| 4,637,626 A * | 1/1987 | Foss et al. | 280/651 |
| 4,746,141 A * | 5/1988 | Willis | 280/655 |
| 5,326,116 A * | 7/1994 | Flax | 280/47.371 |
| 5,599,037 A * | 2/1997 | Spickler | 280/652 |
| 5,810,408 A | 9/1998 | Armstrong | |
| 5,853,180 A * | 12/1998 | Taylor | 280/32.6 |
| 5,911,424 A * | 6/1999 | Rovinsky | 280/79.11 |
| 6,024,376 A * | 2/2000 | Golichowski et al. | 280/655.1 |
| 6,283,496 B1 * | 9/2001 | Dickmann | 280/652 |

* cited by examiner

*Primary Examiner*—Christopher P. Ellis
*Assistant Examiner*—Jeff Restifo
(74) *Attorney, Agent, or Firm*—Roy, Kiesel, Keegan & DeNicola

(57) ABSTRACT

The mobile medical device carrier is a wheeled, human-operated cart designed to assist the operator by providing a place to secure a medical apparatus such as a Vacuum Assisted Closure (V.A.C.) device, as well as store assorted dressings, cords, and other personal effects that may be convenient to have on the cart as well. The cart is easily maneuverable, permitting those individuals using such medical devices to be mobile, despite having to be in close proximity to these types of devices. Further, the handle is designed so that the operator of the cart does not have to stoop over to reach the handle, as well as being ergonomically designed to permit the cart to be easily pushed or pulled, depending upon the user's current need.

17 Claims, 3 Drawing Sheets

Fig. 3

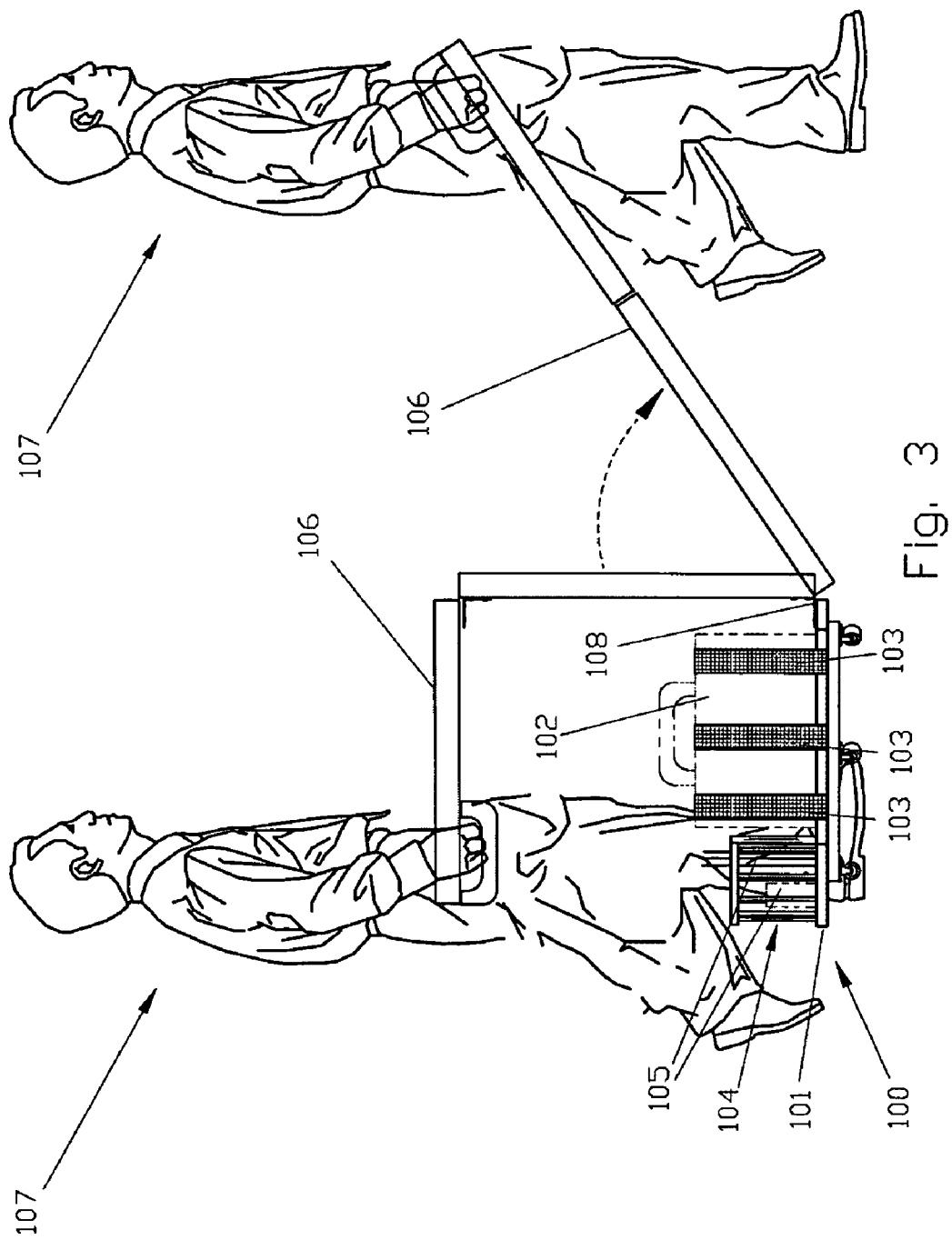

MEDICAL DEVICE CARRIER

CONTINUATION HISTORY

This application is a continuation of U.S. patent application Ser. No. 10/225,939 filed on Aug. 21, 2002 now abandoned, which is hereby incorporated by reference in its entirety.

TECHNICAL FIELD

According to the present invention, the mobile medical device carrier is a wheeled, human-operated cart designed to assist the operator by providing a place to secure a medical apparatus such as a Vacuum Assisted Closure (V.A.C.) device, as well as store assorted dressings, cords, and other personal effects that may be convenient to have on the cart as well. The cart is easily maneuverable, permitting those individuals using such medical devices to be mobile, despite having to be in close proximity to these types of devices. Further, the handle is designed so that the operator of the cart does not have to stoop over to reach the handle, as well as being ergonomically designed to permit the cart to be easily pushed or pulled, depending upon the user's current need.

INDUSTRIAL APPLICABILITY

The present invention relates to a cart able to carry various portable medical devices, and which facilitates the easy transport of the same by a person. This is preferable, and in some cases required, to provide a person or patient with the needed independence of being able to tote their medical apparatus as well as walk around, with little or no outside assistance.

Many people, particularly the infirm or elderly, require various medical apparatus to keep them healthy, most of which are heavy and bulky, or at the very least, inconvenient. These devices are often tethered to the patient, meaning they must maintain a close proximity in order for the apparatus to be effective. Add to this most of these peoples' relative inability to carry heavy items any distance, and you have a recipe for inactivity and immobility, exactly the opposite lifestyle most people need to maintain or restore their health.

The current invention fills the existing gap in technology by providing a cart that employs a handle that, due to its positioning and ergonomics, enables the user to easily push it alongside them, or to pull it behind, if desired. Additionally, the unique employment of swivel wheels in relation to the aforementioned handle make possible easy maneuvering, particularly around corners and in tight spaces. The cart has room on its platform for the desired medical apparatus, such as a Vacuum Assisted Closure (V.A.C.) unit, respirator, or the like. In this fashion, mobility is restored to the user of the cart, boosting mobility, decreasing fatigue and netting an overall increase in morale, and hopefully, health.

MODE FOR THE INVENTION

One object of the invention is to provide a device capable of carrying a medical device, thus freeing the user of the need to carry or find space for such medical device.

Another object of this invention is to provide a mobile medical device carrier capable of being easily pushed or pulled.

Still another object of the invention is to provide a device with a handle that will not drop beyond a certain point, thus providing a handle without having to stoop over to grab such handle.

Other objects and advantages of this invention shall become apparent from the ensuing descriptions of the invention.

BRIEF DESCRIPTION OF THE DRAWINGS

The accompanying drawings illustrate an embodiment of this invention. However, it is to be understood that this embodiment is intended to be neither exhaustive, nor limiting of the invention. They are but examples of some of the forms in which the invention may be practiced.

FIG. 3 shows a side view of the mobile medical device carrier with the handle in various positions.

BEST MODE FOR CARRYING OUT THE INVENTION

Figure 1:
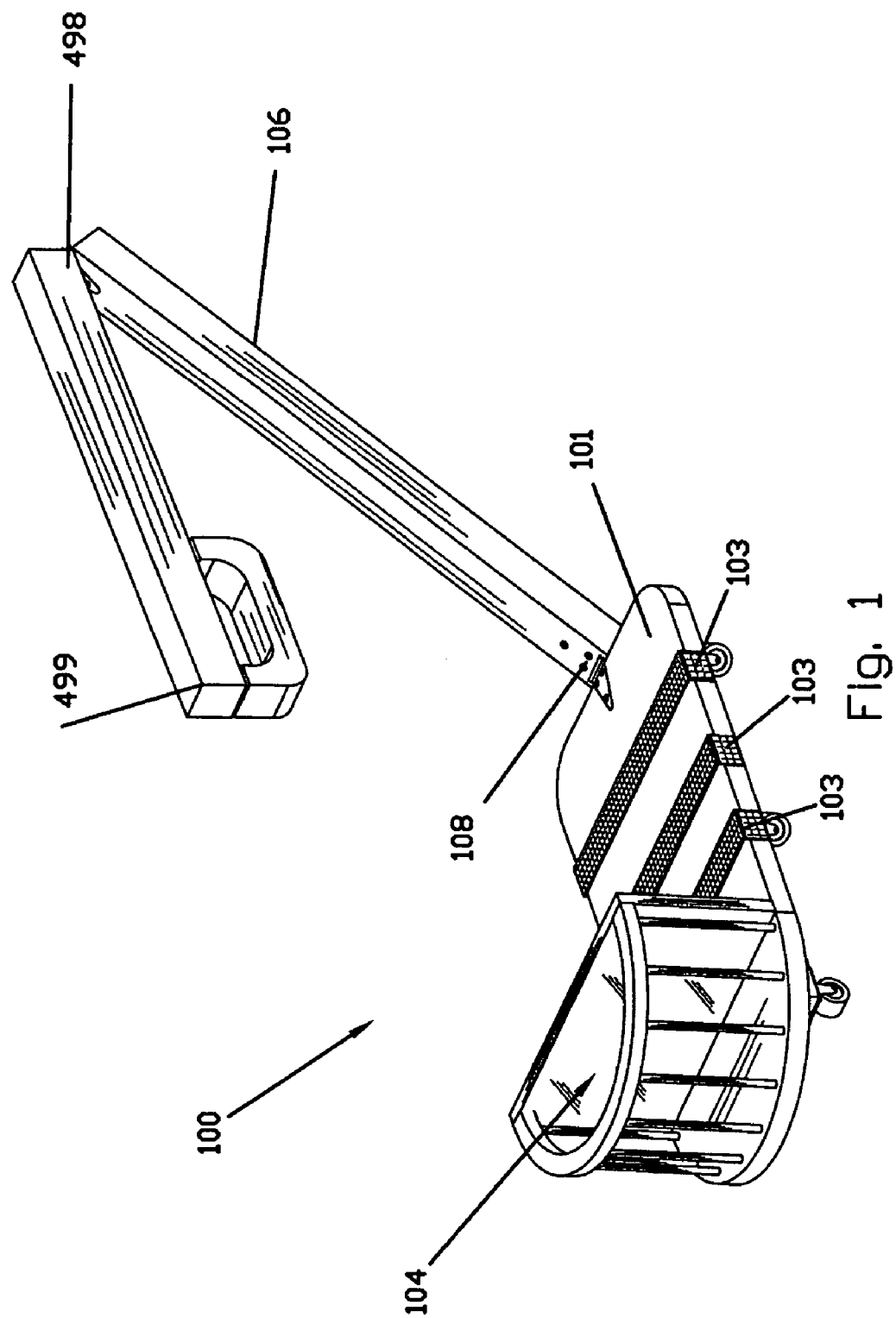
FIG. 1 shows a perspective view of the mobile medical device carrier
Figure 2A:
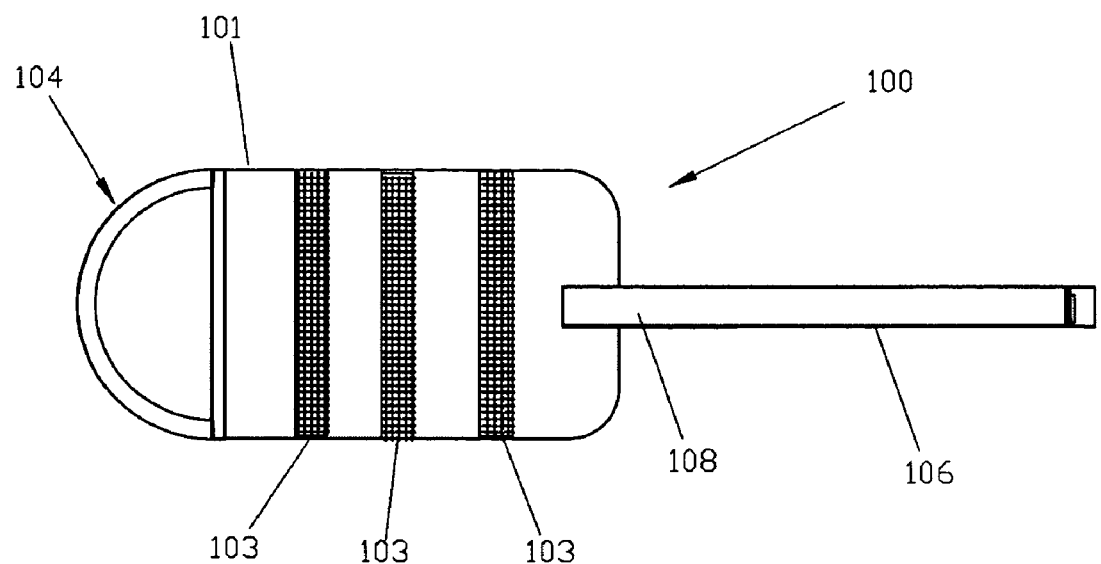
FIG. 2A shows a top view of the mobile medical device carrier.
Figure 2B:
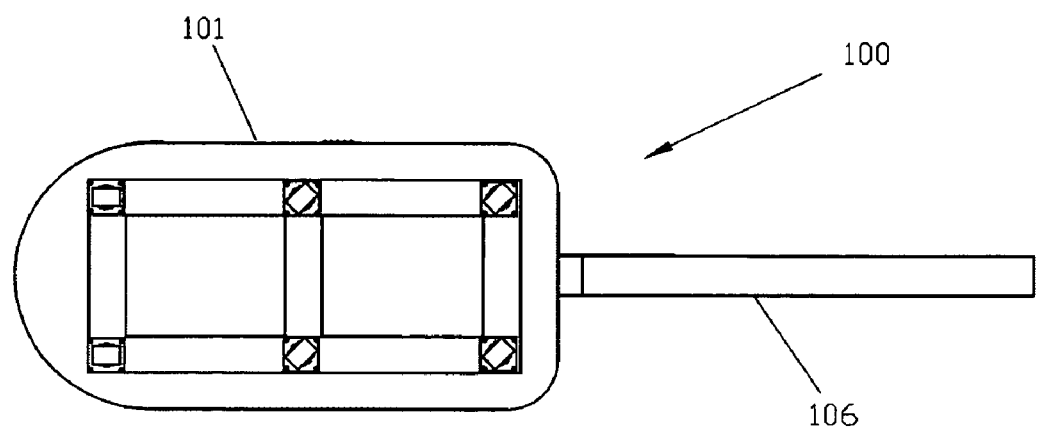
FIG. 2B shows a bottom view of the mobile medical device carrier.

Without any intent to limit the scope of this invention, reference is made to the figures in describing the various embodiments of the invention. Referring to FIGS. 1 through 3, a mobile medical device carrier 100 is pictured, having platform 101 where medical device 102 can be placed and secured by straps 103. Implementations may also include a small repository 104 where small articles 105 can be stored alongside medical device 102. Carrier 100 will also have a handle 106 attached to platform 101 in order for user 107 to be able to steer and otherwise maneuver carrier 100.

In operation, medical device 102, such as a Vacuum Assisted Closure unit (V.A.C.), a respirator or an oxygen tank, would be placed on or in carrier 100 and secured with straps 103, which can be of many types, as will be readily apparent to those versed in the art. Hook and loop fastener, such as VELCRO, is an example of one such type of strapping material. Tubing or other small articles 105 could also be placed on carrier in the repository 104 on carrier 100.

Once loaded and ready, user 107 can utilize carrier 100 by using his or her hand to engage handle 106 to propel carrier 100 in the direction user 107 is traveling. Propulsion from user 107 can originate as a pushing motion when handle 106 is in a partially folded position, as seen in FIG. 3. Propulsion from user 107 can also be a pulling motion, when handle 106 is in its extended position, permitting user 107 to pull carrier 100 behind himself, also seen in FIG. 3. Propulsion can also be derived from a propulsion device 497 such as a motor or the like.

One of the unique aspects of carrier 100 is handle 106 which aids user 107 by not requiring user 107 to stoop over to retrieve handle 106. Handle 106 is configured such that first hinge 108 prevents handle 106 to travel in an arc no greater than approximately 15 degrees from the floor beneath carrier 100, and upwards again to approximately 90 degrees relative to platform 101. First hinge 108 travel can be controlled by using first hinge 108 with limited travel, or shaping or positioning handle 106 in such a way to prevent travel beyond a certain point. Various methods of limiting travel will be readily apparent to those skilled in the art. In this way, user 107 is not ever required to stoop or bend over, which can place additional strain on damaged or underdeveloped muscles (such as those in the back, legs or neck) which may lead to discomfort to user 107 or even further injury.

This handle is also preferably constructed of two sections, namely a handle leader 499 and the handle 106. These can be attached via various means, such as a second hinge 498 or other type of attachment, fixed or otherwise, which gives handle leader 499 the ability to be extended back across the length of the platform 101 such that carrier 100 can be pushed along or to be extended in front of platform 101 in order to be pulled behind the user 107. The travel of handle leader 499 is limited as well, such that second hinge 498 only permits handle leader 499 to travel an arc approximately 180 degrees relative to handle 106 to a position approximately 90 degrees relative to handle 106.

This dual-hinged system permits the unique force direction properties of the carrier 100, namely, that when handle 106 and handle leader 499 are folded to be above platform 101, user's 107 pushing force is translated into a pulling motion on carrier 100, aiding in mobility and ease of use.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A mobile medical device carrier comprising:
    a. a platform comprising first and second opposite faces and further comprising first and second opposite ends; wherein said first opposite face is shaped to hold a medical device;
    b. an array of wheels operatively attached to said second opposite face;
    c. a first hinge operatively attached to said first opposite end;
    d. a handle having first and second opposite ends with said first opposite end operatively attached to said first hinge and configured to permit restricted movement in an arc from a position approximately perpendicular to the plane of said platform to a position away from said platform and approximately 15 degrees above the plane of said platform such that said handle is prevented from entering said plane of said platform;
    e. a second hinge operatively attached to said second opposite end of said handle; and
    f. a handle leader operatively attached to said second hinge wherein said second hinge is configured to permit restricted movement of said handle leader in an arc from an approximately endwise relationship to said handle to a position approximately perpendicular to said handle, wherein said arc of travel is contained above the plane of said platform.

2. The mobile medical device carrier according to claim 1 further comprising flexible straps operatively attached to said platform and positioned to secure said medical device.

3. The mobile medical device carrier according to claim 2 wherein said array of wheels comprise three pairs of wheels, wherein at least one pair of said wheels are configured to swivel about their position on said platform, permitting steering and ease of propulsion of said mobile medical device carrier.

4. The mobile medical device carrier according to claim 3 wherein said handle leader further comprises a grip shaped to receive a human hand.

5. The mobile medical device carrier according to claim 1 further comprising a repository on said second opposite end of said platform sized to fit small articles for storage on said platform.

6. The mobile medical device carrier according to claim 5 wherein said array of wheels comprise three pairs of wheels, wherein at least one pair of said wheels are configured to swivel about their position on said platform, permitting steering and ease of propulsion of said mobile medical device carrier.

7. The mobile medical device carrier according to claim 6 wherein said handle leader further comprises a grip shaped to receive a human hand.

8. The mobile medical device carrier according to claim 1 further comprising a propulsion device operatively attached to at least one of said wheels to permit self-propulsion of said mobile medical device carrier.

9. A mobile medical device carrier comprising:
    a. a platform comprising first and second opposite faces and further comprising first and second opposite ends; wherein said first opposite face is shaped to hold a medical device;
    b. an array of wheels operatively attached to said second opposite face;
    c. a first hinge operatively attached to said first opposite end of said platform;
    d. a handle assembly operatively attached to said first hinge, wherein said handle assembly is restricted to rotate about said first hinge in an arc from approximately 15 degrees above the plane of said platform to approximately 90 degrees above the plane of said platform;
    e. a second hinge attached to the said handle assembly;
    f. a handle leader attached to said second hinge which is configured to restrict the movement of said handle leader from a position approximately 180 degrees in relationship to said handle to a position approximately 90 degrees perpendicular to said handle, and wherein said movement is confined to an area in the plane above said platform.

10. The mobile medical device carrier according to claim 9 further comprising flexible straps operatively attached to said platform and positioned to secure said medical device.

11. The mobile medical device carrier according to claim 10 wherein said array of wheels comprise three pairs of wheels, wherein at least one pair of said wheels are configured to swivel about their position on said platform, permitting steering and ease of propulsion of said mobile medical device carrier.

12. The mobile medical device carrier according to claim 11 wherein said handle leader further comprises a grip shaped to receive a human hand.

13. The mobile medical device carrier according to claim 9 further comprising a repository on said second opposite end of said platform sized to fit small articles for storage on said platform.

14. The mobile medical device carrier according to claim 13 wherein said array of wheels comprise three pairs of wheels, wherein at least one pair of said wheels are configured to swivel about their position on said platform, permitting steering and ease of propulsion of said mobile medical device carrier.

15. The mobile medical device carrier according to claim 14 wherein said handle leader further comprises a grip shaped to receive a human hand.

16. The mobile medical device carrier according to claim 9 further comprising a propulsion device operatively attached to at least one of said wheels to permit self-propulsion of said mobile medical device carrier.

17. A mobile medical device carrier comprising:
 a. a platform comprising first and second opposite faces and further comprising first and second opposite ends; wherein said first opposite face is shaped to hold a medical device;
 b. an array of wheels operatively attached to said second opposite face;
 c. a first hinge operatively attached to said first opposite end;
 d. a handle having first and second opposite ends with said first opposite end operatively attached to said first hinge and configured to permit restricted movement in an arc from a position approximately perpendicular to the plane of said platform to a position away from said platform and approximately 15 degrees above the plane of said platform such that said handle is prevented from entering said plane of said platform
 e. a second hinge operatively attached to said second opposite end of said handle; and
 f. a handle leader operatively attached to said second hinge wherein said second hinge is configured to permit restricted movement of said handle leader in an arc from an approximately endwise relationship to said handle to a position approximately perpendicular to said handle, wherein said arc of travel is contained above the plane of said platform.

* * * * *